UNITED STATES PATENT OFFICE.

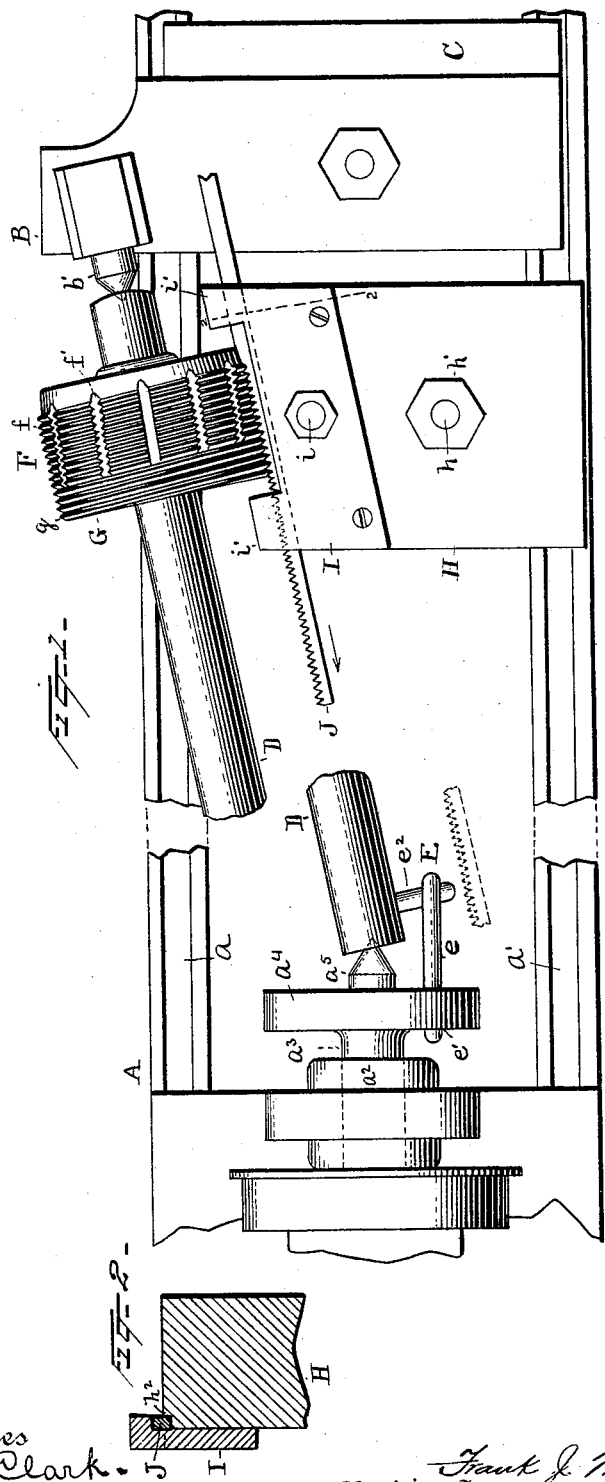

FRANK J. MATHEIN, OF NEW HAVEN, CONNECTICUT.

RACK-CUTTER.

SPECIFICATION forming part of Letters Patent No. 583,065, dated May 25, 1897.

Application filed November 9, 1896. Serial No. 611,449. (No model.)

*To all whom it may concern:*

Be it known that I, FRANK J. MATHEIN, a citizen of the United States, residing at New Haven, in the county of New Haven and State of Connecticut, have invented a certain new and useful Improvement in Rack-Cutters, of which the following is a specification.

My invention relates to rack-cutters, and has for its object the provision of simple and durable apparatus for cutting teeth continuously in either the edge or face of a traveling strip or bar.

A further object is to so construct the device as that the supporting and power-transmitting mechanism of an ordinary turning-lathe may be utilized for operating the cutting and feeding media.

A further object is to so construct and arrange the latter as that the operation of feeding the work shall be insured by the operation of the cutter.

A further object is to so mount the cutter and feeder as to permit of the use of cutters of ordinary diameter adapted to operate upon continuous strips of work and to permit of the ready removal and the equally ready substitution of corresponding parts adapted to cut teeth of different size or pitch.

To these ends I employ a lathe-frame having a bed, driving-head, back-support, and tail-stock, said back-support being adjustable relatively to the driving-head. The driving-head and back-support are provided with bearings upon which is mounted an arbor to which rotary action is transmitted by the driving-head. Upon this arbor is mounted a cutter-head having tooth-cutting devices upon its exterior and a feed-worm, both said cutter-head and feed-worm being keyed or otherwise secured to the arbor. The work acted upon by the cutter-head and feed-worm is mounted in an adjustable work-carrying chuck, such work traveling through suitable guideways in said chuck. The work on being fed through the guideways is acted upon by the cutter-head and provided with a series of teeth by the tooth-cutting medium on the exterior of such cutter-head. That portion of the work so acted upon is next engaged by the feed-worm, and the threads of such feed-worm being of the same size and pitch as the teeth formed in the work said worm causes the work to travel and be acted upon continuously by the cutter-head. It will thus be seen that the operation of the feed-worm is dependent upon that of the cutter, and that as the cutter operates upon the work to provide it with teeth the feed-worm operates upon it to pass it along through the guideways. It will also be seen that the cutting and feeding mechanism may be readily removed from operative position by simply loosening the clamping-screw of the back-support upon which one of the arbor-bearings is mounted. This is of importance, since the cutter-head and feed-worm are adapted to cut and feed work provided by the cutter with teeth of certain determinate size and pitch. In order, therefore, to change the size and pitch of teeth cut in the work passing through the guides, it is necessary to substitute a cutter-head and feed-worm of that size and pitch.

In the drawings, Figure 1 is a plan view of a rack-cutting apparatus embodying my invention, and Fig. 2 is a detail illustrating the construction of the work-guide.

Referring to these drawings, A designates a lathe-bed having ways $a\ a'$ and a bearing $a^2$, in which is mounted the shaft $a^3$, which communicates motion to the driving-head $a^4$. The head-stock $a^4$ is provided with a bearing (preferably a center bearing) $a^5$.

B designates the back-support, and C the tail-stock. These are so mounted upon the lathe-bed A as to be adjustable toward and from the head-stock $a^4$. They are provided with the usual means (not shown in detail) for clamping them in position. The back-support B is provided on its upper surface and in the present instance near one end with a dead-center $b'$, secured in position in any suitable manner.

D designates an arbor. This is provided at either end with center bearings which receive the live-center $a^5$ of the head-stock $a^4$ and the pivot $b'$ of the back-support B.

E designates the lathe-dog. In the present instance this consists of an arm $e$, one end of which is received in a socket $e'$ in the driving-head and so held against displacement by frictional contact. Another arm $e^2$ is preferably in a similar manner secured at one end to the arbor D. The free ends of the arms $e\ e^2$ engage each other, so that as the driving-head $a^4$ rotates rotary movement is transmitted to the arbor D. Mounted upon the arbor D is the cutter-head F, provided upon its exterior with the cutting threads or teeth $f$, the latter being interrupted by grooves or channels $f'$ in the usual manner.

G designates the feed-worm, provided upon its exterior with threads $g$, corresponding in size and pitch to the threads or teeth $f$ on the cutter-head F next adjacent to said worm. The feed-worm is, as here shown, located in proximity to the cutter-head F. It may, if desired, be formed integral therewith. Both the feed-worm and cutter-head are keyed or otherwise secured to the arbor D. They therefore rotate with the rotation of such arbor.

H designates the work-guide. This is mounted upon the grooved arm $a'$ of the lathe-bed and is provided with suitable means for clamping it in position. In the present instance such means are shown as consisting of a bolt $h$, having a nut $h'$. When the work-guide is adjusted to the proper position to present the work to the action of the cutter and feed-worm, the clamping device is employed to lock the work-guide in that position. The free end of the work-guide H is in the present instance inclined coincidently with the longitudinal axis of the arbor D. The work-guide is provided adjacent to its free end with a guide-plate I. As here shown, this guide-plate may be secured in position by means of screws $i$. The free end of the work-guide H is recessed at $h^2$, as shown in detail in Fig. 2, and the guide-plate is provided at either end with an extension $i'$, which projects above and over the recess $h^2$. The work, here shown as a strip or bar J, travels within the recess $h^2$, being guided and held in position by the extensions $i'$ $i'$ at the ends of the plate I and by the upper edge of the plate intermediate of such ends. The relativity of the work-guide and the cutter and feeder is such that the work in passing through the guideways will be operated upon by said cutter and feeder, the former cutting the teeth therein and the latter coacting with such teeth to feed the work to the cutter and as it is completed to pass it along away from the lathe. Such work is permitted to pass freely from the work-guide without interference with the driving or other mechanism, owing to the mounting of the arbor and its mechanism at an angle to the longitude of the lathe and to the provision for moving the work at substantially the same angle.

What I claim, and desire to secure by Letters Patent, is—

1. In a rack-cutting attachment for lathes the combination with an arbor carried between the head-stock and the tail-stock of the lathe, of a cutter-head and feed-worm on said arbor, the latter having movement coincident with that of said cutter-head, and an adjustable work-guide for holding up the work against the cutter-head and feed-worm, substantially as set forth.

2. In a rack-cutting attachment for lathes the combination with an arbor driven by the live-center of the lathe, of a cutter-head and feed-worm on said arbor, an adjustable tail-stock, supporting the said arbor at an angle to the axis of revolution of the said live-center and an adjustable work-holder for holding up the work against the cutter-head and feed-worm, for the purpose substantially as set forth.

This specification signed and witnessed this 2d day of November, 1896.

FRANK J. MATHEIN.

Witnesses:
C. W. DORLAND,
ROGER A. TOWNSEND.